Aug. 15, 1950 L. W. KASZOLKA 2,518,898
TAP FOR MAKING SCREW THREADS
Filed June 25, 1946 3 Sheets-Sheet 1
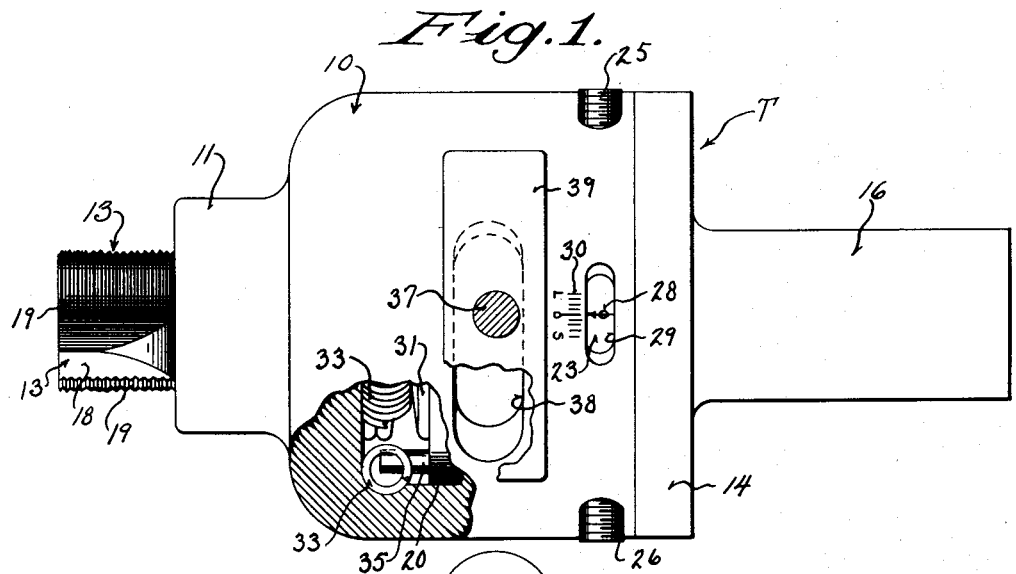
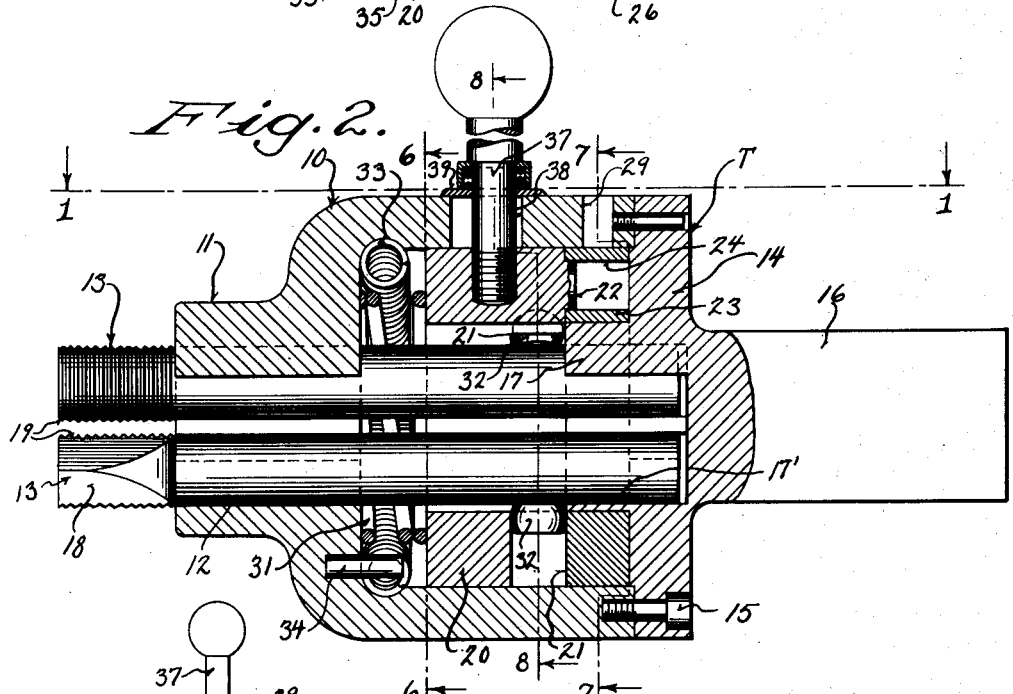
INVENTOR
LEONARD W. KASZOLKA
BY
ATTORNEYS Aug. 15, 1950 — L. W. KASZOLKA — 2,518,898
TAP FOR MAKING SCREW THREADS
Filed June 25, 1946 — 3 Sheets-Sheet 2

INVENTOR
LEONARD W. KASZOLKA
BY
ATTORNEYS

Aug. 15, 1950  L. W. KASZOLKA  2,518,898
TAP FOR MAKING SCREW THREADS

Filed June 25, 1946  3 Sheets-Sheet 3

INVENTOR
LEONARD W. KASZOLKA
BY
ATTORNEYS

Patented Aug. 15, 1950

2,518,898

UNITED STATES PATENT OFFICE 2,518,898

TAP FOR MAKING SCREW THREADS

Leonard W. Kaszolka, Milwaukee, Wis., assignor to K.-W. Products, Inc., Milwaukee, Wis., a corporation of Wisconsin Application June 25, 1946, Serial No. 679,198

5 Claims. (Cl. 10—143)

1

This invention appertains to thread cutting tools and more particularly to a collapsible tap.

One of the primary objects of the invention is to provide an adjustable collapsible tap having novel means for carrying and supporting the chasers, whereby to insure the correct, quick and automatic collapse of the chasers at the proper time and to provide a firm and rugged mounting therefor.

Another salient object of the invention is to provide novel means for associating the chasers with the other parts of the tap, whereby the chasers will be held properly located, both radially and longitudinally relative to the longitudinal axis of the tap and the work being threaded.

A further object of my invention is to provide a novel control collar and a novel set collar for the chasers, so that the chasers will be effectively held and positioned thereby and thus eliminate the necessity of providing additional or extraneous holding means for the chasers.

A further important object of the invention is to provide means, whereby the setting collar can be accurately adjusted to change the active position of the chasers for cutting threads in openings of slightly different diameters.

A still further object of my invention is the provision of novel buttons carried by the chasers for cooperation with the control collar, whereby the chasers will be readily turned, without binding, with the collar upon the tripping of the collar, the construction being such that the chasers through said buttons are carried by and supported by the control and setting collars.

A still further important object of the invention is to provide an adjustable collapsible tap of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Fig. 1 is a side elevational view of the improved collapsible tap, parts of the figure being shown broken away and in section to illustrate structural details.

Fig. 2 is a longitudinal sectional view through the tap taken substantially on the line 2—2 of the Figure 6 looking in the direction of the arrows.

Fig. 3 is a rear elevational view of the tap, the

2 view being taken on a much smaller scale than the other figures of the drawings.

Figure 4:
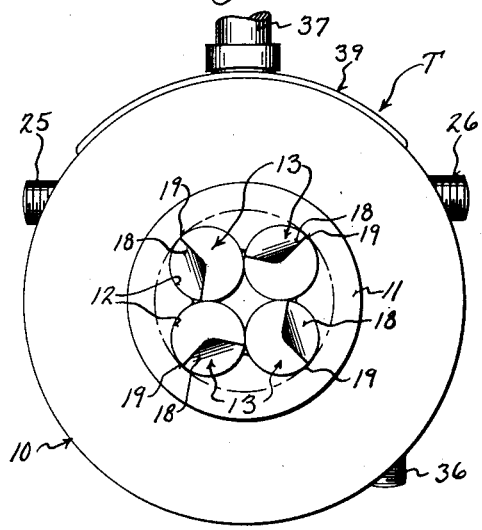

Fig. 4 is a front elevational view of the tap with the resetting handle shown broken away, the view illustrating the cutting position of the chasers.

Figure 5:
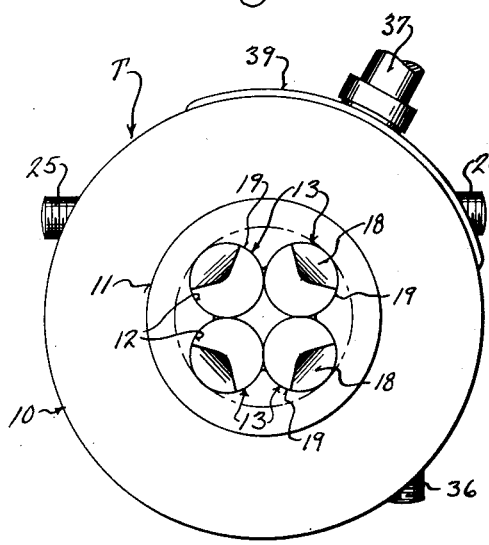

Fig. 5 is a view similar to Figure 4, but showing the chasers in their collapsed position.

Figure 6:
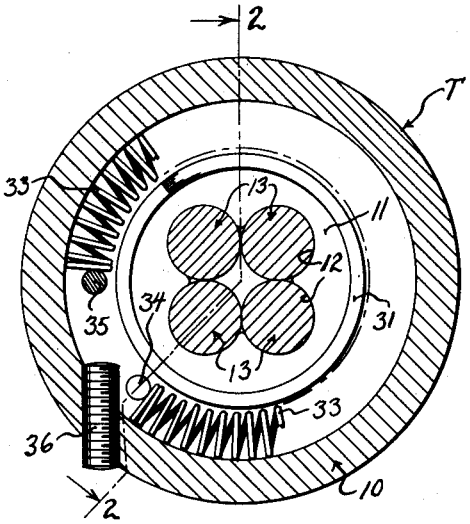

Fig. 6 is a transverse sectional view through the tap taken substantially on the line 6—6 of Figure 2 looking in the direction of the arrows, the view showing the spring means employed for turning the control collar and the chasers upon the tripping of the collar.

Figure 7:
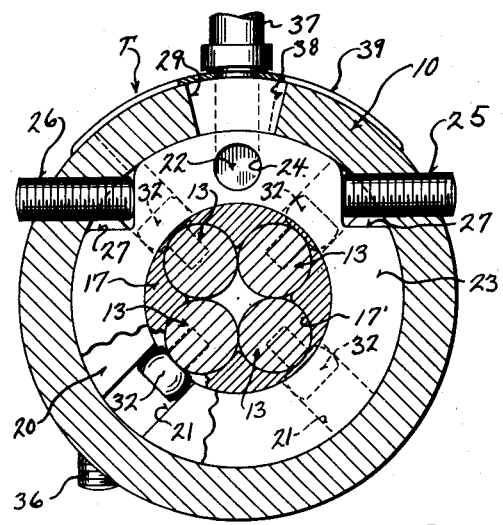

Fig. 7 is a transverse sectional view through the tap taken substantially on the lines 7—7 of Figure 2 looking in the direction of the arrows and illustrating the novel setting collar and the novel connection between the chasers and the control collar.

Figure 8:
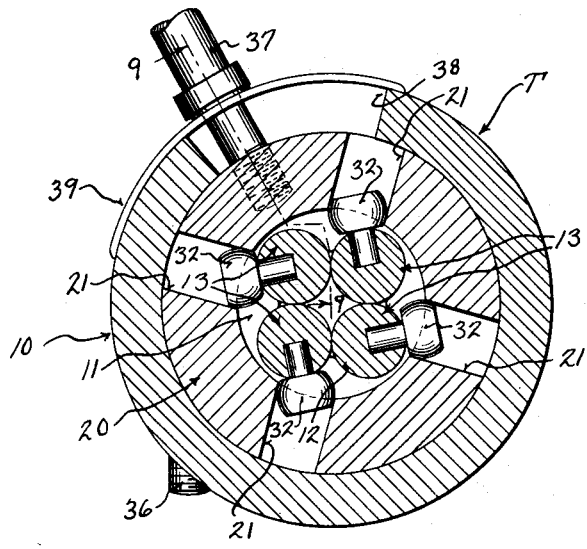

Fig. 8 is a transverse sectional view through the tap taken substantially on the line 8—8 of Figure 2 looking in the direction of the arrows, the view illustrating the position of the control collar and the chasers after the tripping of the control collar and the collapsing of the chasers.

Figure 9:
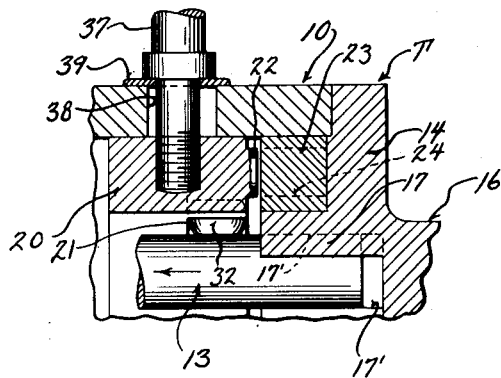

Fig. 9 is a fragmentary longitudinal sectional view taken substantially on the line 9—9 of Figure 8 looking in the direction of the arrows, the view illustrating the position of the control collar after the collapsing thereof.

Referring to the drawings in detail wherein similar reference characters designate corresponding parts throughout the several views the letter "T" generally indicates the improved tap and the same includes a hollow body 10. The body 10 has formed on its forward terminal a restricted neck 11 and this neck has its inner face provided with arcuate bearing channels 12 for rotatably receiving the chasers or cutting tools 13. The rear end of the body 10 is open and is normally closed by a rear wall 14. This rear wall is secured to the body 10 in any preferred manner, such as by machine screws 15. A rearwardly extending shank 16 is formed on the rear wall and permits the association of the tap with a turret lathe, drill press or any other suitable machine. Formed on the inner face of the rear wall 14 is a hollow boss 17 and this boss is in axial alinement with the neck 11. The inner face of this boss is also provided with longitudinally extending bearing channels 17' for rotatably receiving the rear ends of the chasers.

The chasers 13 can be of any preferred number and in the present instance, four chasers have been illustrated. All of these chasers are of like construction and are of the type commonly used in collapsible taps. The chasers are in rolling contact with one another and the group of chasers brace one another, due to their engagement, and form a rugged structure. The chasers protrude forwardly on the neck 11 and have their forward ends provided with longitudinally extending cutout portions 18 which define leading cutting edges. The other portions of the chasers are provided with the tap cutting surfaces 19. When the tap is collapsed the cutout portions 18 are disposed outermost (see Figure 5) so that the cutting portions of the chasers will be out of engagement with the work. It is to be understood at this point that only the forward ends of the chasers are provided with the cutout portions and the tap cutting surfaces.

Arranged within the body 10 is the axially rotatable control collar or ring 20 and this collar has formed in its rear surface, at quarters, notches 21. Also formed on the rear surface of the control collar is a trip stud or pin 22, the purpose of which will later appear.

A set collar 23 is mounted upon the outer surface of the hollow boss 17 and the set collar has formed therein a longitudinally extending opening 24 for normally receiving the trip pin or stud 22. The set collar engages the rear wall 14 and the control collar normally fits against the set collar when the chasers 13 are in their operative tapping position as shown in Figure 2.

The set collar can be turned on the boss for a limited adjustment, for a purpose which will also later appear, but it is to be understood that after the adjustment of the set collar the same is held against movement. Adjustment of the set collar can be had by means of oppositely disposed screws 25 and 26. These screws are threaded into the body 10 and the inner ends thereof abut the walls of the notches 27 which are formed in the set collar 23. Obviously by loosening one screw and tightening the other screw the set collar can be turned and held in the desired set position. An index point or arrow 28 can be formed on the outer face of the set collar 23 and this index point appears through a sight slot 29 formed in the body 10. Graduations 30 can be formed on the outer surface of the body along one edge of the sight slot for cooperation with the index point and the index point with the graduation will permit the user of the tap to set the chasers for larger or smaller diameters. This will be more particularly described at a later point.

An expansion spring 31 is placed within the body about the chasers and this spring bears against the front wall of the body and the control collar 20 and functions to normally hold the control collar against the set collar with the trip pin or stud in the opening 24. Obviously when the control collar is in this position rotation thereof is prevented.

Movement of the control collar is transmitted to the chasers 13 in a novel manner, as will be now described. Each chaser has formed thereon or secured thereto a radially extending stud or button 32 and these buttons are received within the notches 21 formed in the control collar. Attention is directed to the fact that the buttons normally engage the inner walls of the notches 21 and the front face of the set collar 23. The buttons are of a novel construction and by referring to Figures 2, 7 and 8 it can be seen that the buttons are of a cylindrical form, but that their outer faces are curved arcuately lengthwise. In other words the buttons are of a spherical form with the opposite ends thereof truncated. Due to this connection between the control collar and the chasers, upon rotation of the control collar, the chasers will be rotated.

A coil spring 33 is placed within the body about the coil spring 31 and this spring 33 is flexed into a substantially annular shape and one end of the spring bears against a stop pin 34 rigidly secured to the body. The other end of the spring bears against a forwardly projecting pin 35 carried by the control collar 20 and hence this spring functions to normally turn the control collar. When the control collar is disengaged from the set collar, the spring 33 will then rotate the control collar. A set screw 36 is threaded into the body 10 and forms a stop for the pin 35 and hence this set screw limits the rotation of the control collar.

In operation of the improved tap, the same is associated and clamped in the desired machine, such as a turret lathe. The work is now rotated and the tap is brought forwardly into the opening to be threaded. At this point, it is to be understood that the set collar has been initially set for the correct size and that the chasers are in their correct position for tapping the opening. This position of the tap is shown in Figure 4. After the tap has traveled the desired distance, further feeding of the tap is stopped, the work rotating on the chasers will feed or pull the chasers forwardly. This pulling will slide the chasers and the control collar 20, through the medium of the buttons 32, forwardly and longitudinally of the tap body. This will disengage the trip stud 22 from the opening 24 in the set collar and consequently the spring 33 can now function to turn the control collar. The turning of the control collar will rotate the chasers to the position shown in Figure 5 and the cutout portions 18 of the chasers will be disposed outermost. The tap can now be pulled out from the opening. Particular attention is invited to Figure 8 and it is to be noted that upon turning of the control collar 20, the buttons 32 will be moved so as to rotate the chasers and that due to the arcuate faces of the buttons, no binding action will occur and the buttons will remain in contact with the side walls of the notches 21.

In order to move back the control collar and the chasers to their normal position, after the collapsing of the tap, the control collar is provided with a radially extending manipulating handle 37. This handle protrudes through a slot 38 formed in the body. An operator can grasp this handle 37 and rotate the control collar till the trip stud 22 alines with the opening 24, at which time the spring 31 will push the control collar rearwardly and the stud into the opening. Moveable with the handle 37 is a cover plate 39 and this cover plate merely functions to close the slot 38 so as to prevent the entrance of chips and debris into the body.

Due to the connection between the set collar and control collar, upon an initial adjustment of the set collar the control collar will be turned therewith and turning movement of the control collar will impart the desired movement to the chasers.

In the drawings, the tap has been shown for tapping right hand threads, but obviously the tap can be made for tapping left hand threads.

Changes in detail may be made without departing from the spirit and scope of my invention, but what I claim as new is:

1. A tap comprising a hollow body, a plurality of axially rotatable chasers having their rear ends disposed in said body and their cutting ends projecting forwardly from said body, a set collar in said body, a control collar in said body mounted for turning movement having a rearwardly projecting trip stud, said set collar having an opening, spring means normally holding the control collar in abutting engagement with the set collar and the stud in the opening, spring means normally tending to rotate said collar when said collar is moved longitudinally away from the set collar, and means operatively connecting the chasers with the control collar so that upon turning movement of the control collar the chasers will be rotated, said last named means holding the chasers in correct position both longitudinally and radially in said body.

2. A tap comprising a hollow body, a plurality of axially rotatable chasers having their rear ends disposed in the body and their forward cutting ends projecting forwardly from the body, a set collar in said body, a control collar mounted in said body for turning movement having horizontally disposed notches therein, a trip stud on the control collar, said set collar having an opening, spring means normally holding the control collar against said set collar with the stud in the opening, whereby said control collar will be locked to the set collar, radially extending buttons on the chasers fitted in the notches in the control collar and normally bearing at all times against the walls of said notches, said buttons engaging against the set collar when the control collar is in locked engagement with the set collar and spring means in the body normally tending to turn said control collar when the control collar is pulled forwardly away from the set collar with the stud out of the opening therein.

3. A tap comprising a hollow body, a plurality of axially rotatable chasers having their rear ends disposed in the body and their forward cutting ends projecting forwardly from the body, a set collar in said body mounted for turning movement, adjustable means carried by the body holding said set collar against turning movement, a control collar mounted in said body for turning movement having notches therein, a trip stud on the control collar, said set collar having an opening, spring means normally holding the control collar against said set collar with the stud in the opening, whereby said control collar will be locked to the set collar, radially extending buttons on the chasers fitted in the notches in the control collar and normally bearing at all times against the walls of said notches, said buttons engaging against the set collar when the control collar is in locked engagement with the set collar and spring means in the body normally tending to turn said control collar when the control collar is pulled forwardly away from the set collar with the stud out of the opening therein.

4. A tap comprising a hollow body having a rearwardly projecting shank and a forwardly projecting restricted neck, said body also having a forwardly projecting annular boss arranged in axial alinement with the neck, the inner surfaces of the neck and boss being provided with longitudinally alined bearing channels, axially rotatable chasers mounted in said channels, said chasers having forwardly projecting cutting portions arranged exteriorly of the body, a set collar mounted on said boss for turning movement, adjustable means carried by the body engaging the set collar to turn the set collar axially about the boss and to hold the set collar in a set position on the boss, said set collar having an opening, a control collar arranged in said body about the chasers and mounted in said body for turning movement and longitudinal sliding movement, said control collar having notches therein and a rearwardly projecting trip stud, spring means normally holding the control collar against longitudinal movement and in abutting engagement with the set collar with the trip stud in the opening, radially projecting buttons on said chasers received in said notches, said buttons engaging the walls of the notches and the front face of the set collar when the control collar is in engagement with said set collar, spring means normally tending to rotate said control collar whereby upon forward longitudinal movement of the control collar away from the set collar with the trip stud out of the opening said control collar will be turned, and manually operable means connected to said control collar to return the control collar to its normal position with the stud in the opening.

5. A tap comprising a hollow body having a rearwardly projecting shank and a forwardly projecting restricted neck, said body also having a forwardly projecting annular boss arranged in axial alinement with the neck, the inner surfaces of the neck and boss being provided with longitudinally alined bearing channels, axially rotatable chasers mounted in said channels, said chasers having forwardly projecting cutting portions arranged exteriorly of the body, a set collar mounted on said boss for turning movement, adjustable means carried by the body engaging the set collar to turn the set collar axially about the boss, said set collar having an opening, a control collar arranged in said body about the chasers and mounted in said body for turning movement and longitudinal sliding movement, said control collar having notches therein and a rearwardly projecting trip stud, spring means normally holding the control collar against longitudinal movement and in abutting engagement with the set collar with the trip stud in the opening, radially projecting buttons engaging the walls of the notches and the front face of the set collar when the control collar is in engagement with said set collar, spring means normally tending to rotate said control collar whereby upon forward longitudinal movement of the control collar away from the set collar with the trip stud out of the opening said control collar will be turned, and manually operable means connected with set collar to turn the control collar to its normal position with the stud in the opening, said buttons having rounded bearing surfaces.

LEONARD W. KASZOLKA.

REFERENCES CITED

The following references are of record in the file of this patent:

UNITED STATES PATENTS

| Number | Name | Date |
|---|---|---|
| 731,784 | Kelly | June 23, 1903 |
| 775,672 | Dollard | Nov. 22, 1904 |
| 1,059,453 | Grebel | Apr. 22, 1913 |
| 1,203,884 | Lewis | Nov. 7, 1916 |
| 1,394,845 | Koontz | Oct. 25, 1921 |

FOREIGN PATENTS

| Number | Country | Date |
|---|---|---|
| 137,918 | Great Britain | Jan. 29, 1920 |